May 6, 1924.
J. C. ROBESON
HOSE SUPPORTER
Filed Dec. 1, 1922
1,492,859
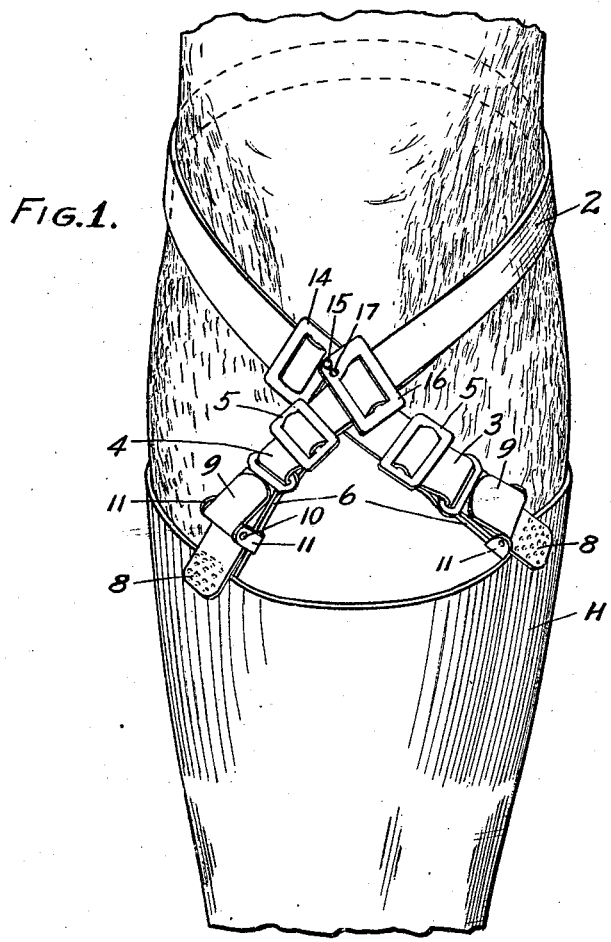
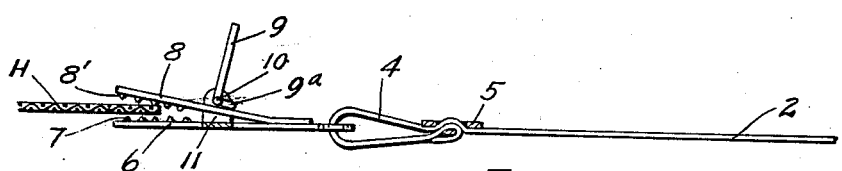
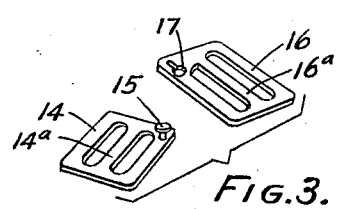
INVENTOR
JOHN C. ROBESON
BY Hazard and Miller
ATT'YS.

Patented May 6, 1924.

1,492,859

UNITED STATES PATENT OFFICE.

JOHN C. ROBESON, OF LOS ANGELES, CALIFORNIA.

HOSE SUPPORTER.

Application filed December 1, 1922. Serial No. 604,306.

*To all whom it may concern:*

Be it known that I, JOHN C. ROBESON, a citizen of the United States, residing at Los Angeles, in the county of Los Angeles and State of California, have invented new and useful Improvements in Hose Supporters, of which the following is a specification.

This invention relates to hose supporters and has for its object to provide a supporter for half hose. Another object of the invention is to provide a supporter that may be readily applied to the limb above the calf and readily connected and disconnected. Another object is to provide a hose supporter having crossed hose-engaging end sections operative to draw the hose around the limb.

Other objects and advantages will be made manifest in the following specification of an embodiment of the invention shown in the accompanying drawings, wherein—

Fig. 1 is a perspective of the applied hose supporter.

Fig. 2 is a sectional view of the hose gripping means.

Fig. 3 is a perspective showing the detached connecting slides of the supporter.

The present invention consists of a suitable length of elastic 2, the ends of which are formed into bights 3 and 4, each of which is provided with a suitable slide 5 whereby the length of the bights, and obviously the effective length of the supporter, is controlled.

Each bight is provided with a gripping device adapted to engage the selvedge or top end of the hose H. Any form of hose engaging and clamping means may be employed, and as shown in Fig. 2, such a clamp may consist of a plate 6, having a toothed or corrugated inner face 7, opposed to which is a spring leaf 8, which may be toothed or otherwise formed as at 8′ so that when the selvedge of the hose is inserted between the plate 6 and the leaf 8, the hose will be firmly gripped. To close the gripping elements together a handle 9 is pivoted at 10 in lugs 11, provided on the plate 6; the handle having a pushing bar or lug 9ª extending radially from the axis of the handle so that when the handle is pushed down, as shown in Fig. 1, the leaf 8 will be closed. The leaf may be of resilient material so that it will automatically spring open when released by the up-turned handle 9.

A feature of the invention consists of provided means whereby the piece of elastic 2, or whatever other material is used, can be drawn with the desired degree of tension around the limb and readily fastened and also unfastened, and further, in such manner that the ends thereof are in crossed relation. The elastic section 2 is shown as provided with a perforated slide 14, with an intermediate bar 14ª, and this slide is provided with a stud 15 which may be at one corner and is preferably provided with a hook or other shoulder at its upper end. On the other end of the elastic 2 is a slide 16, perforated and having an intermediate bar 16ª. One corner of the slide 16 is provided with a keyhole aperture 17; the larger portion of the keyhole being adapted to pass down over the head of the stud 15, and when the plates are shifted after being thus connected, the shank locks in the keyhole 17 and the plates are held against accidental separation and will hold the elastic 2 in tensioned condition about the limb.

It will be seen that when the ends of the elastic are crossed and the clamps applied to the front portion of the hose, there is a tendency of the clamps to pull the hose around the back of the limb in a snug-fitting position.

Further embodiments, modifications and variations may be resorted to within the spirit of the invention as here claimed.

What is claimed is:

1. A hose supporter connecting means including a pair of slide plates through which ends of the supporter elastic is run, one plate having in one corner a key hole, and the other plate having on one corner a hook part to interlock in said hole.

2. A hose supporter having at each of its ends hose gripping means, and means contiguous to the ends of the supporter whereby they may be detachably connected, said attaching means including a hook member sliding on one end of the supporter and an eye member sliding on the other end of the hose supporter.

3. A hose supporter having at each of its ends hose gripping means, and means contiguous to the ends of the supporter whereby they may be detachably connected, said attaching means including a hook member and an eye member, the hook and eye members including slidable plates, mounted on the supporter.

In testimony whereof I have signed my name to this specification.

J. C. ROBESON.